United States Patent
Gaither et al.

(10) Patent No.: US 8,176,293 B2
(45) Date of Patent: May 8, 2012

(54) METHOD AND SYSTEM FOR MOVING ACTIVE VIRTUAL PARTITIONS BETWEEN COMPUTERS

(75) Inventors: Blaine D. Gaither, Fort Collins, CO (US); John A. Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 12/383,766

(22) Filed: Mar. 27, 2009

(65) Prior Publication Data
US 2010/0250877 A1 Sep. 30, 2010

(51) Int. Cl.
G06F 13/00 (2006.01)
G06F 13/28 (2006.01)
G06F 9/26 (2006.01)
G06F 9/34 (2006.01)
G06F 9/455 (2006.01)

(52) U.S. Cl. . 711/173; 711/203; 711/162; 711/E12.016; 711/E12.103; 718/1

(58) Field of Classification Search .................. None
See application file for complete search history.

(56) References Cited

U.S. PATENT DOCUMENTS

2006/0010450 A1* 1/2006 Culter ........................ 718/104
2006/0294351 A1* 12/2006 Rostampour .................. 713/1

* cited by examiner

*Primary Examiner* — Kevin Verbrugge
*Assistant Examiner* — Eric S Cardwell

(57) ABSTRACT

Embodiments of the present invention are directed to enhancing VPAR monitors to allow an active VPAR to be moved from one machine to another, as well as to enhancing virtual-machine monitors to move active VPARs from one machine to another. Because traditional VPAR monitors lack access to many computational resources and to executing-operating-system state, VPAR movement is carried out primarily by specialized routines executing within active VPARs, unlike the movement of guest operating systems between machines carried out by virtual-machine-monitor routines.

20 Claims, 19 Drawing Sheets

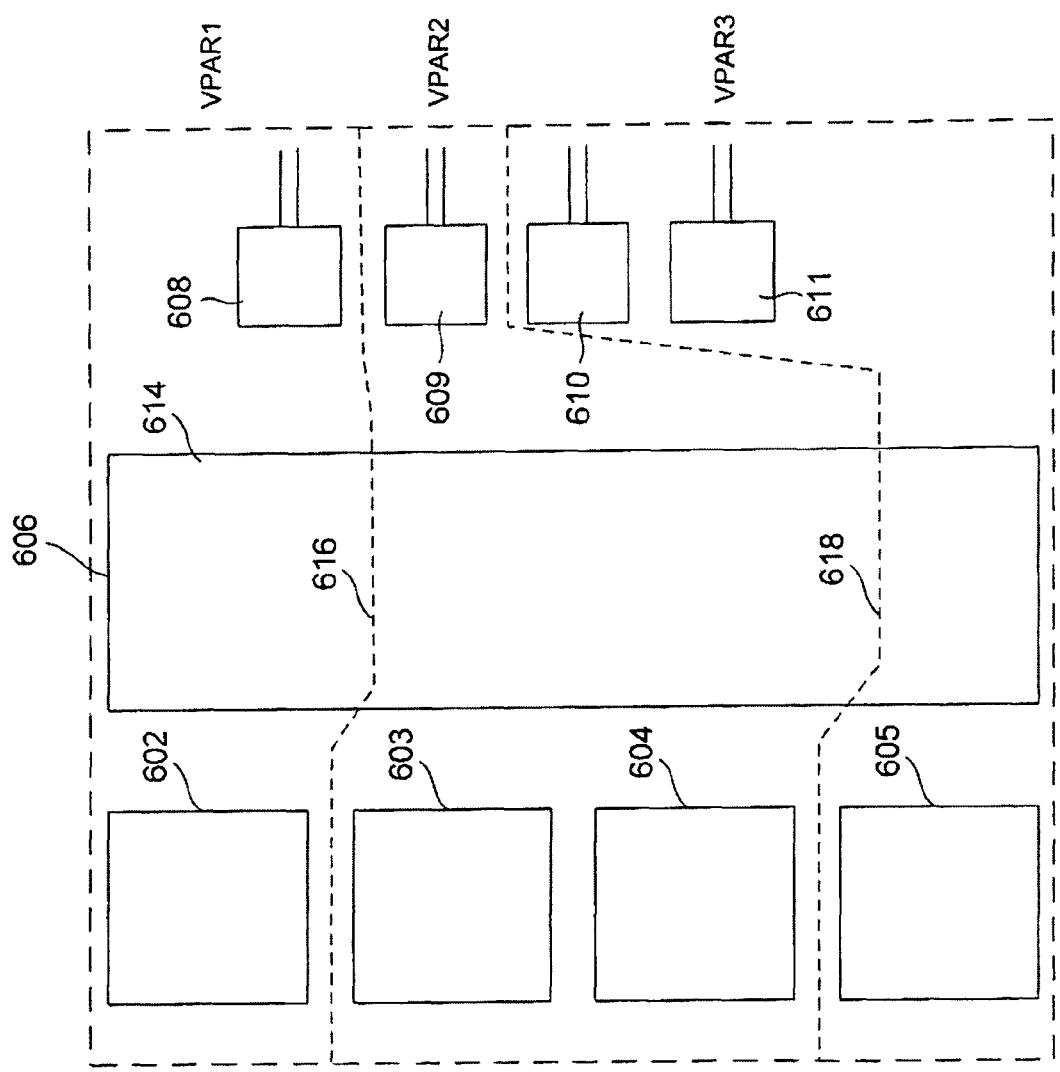

METHOD AND SYSTEM FOR MOVING ACTIVE VIRTUAL PARTITIONS BETWEEN COMPUTERS

TECHNICAL FIELD

The present invention is related to hypervisors, virtual-machine monitors, virtual-partition monitors, and transfer of active guest operating systems and virtual partitions between computers.

BACKGROUND OF THE INVENTION

Early in the evolution of computers and computer systems, even the largest computer systems were designed to run each program to completion before running a next program. The running program generally had full access to any and all system resources, including system memory, the entire available computing bandwidth provided by the processor, and any and all peripheral devices attached to the computer system, including mass-storage devices and input/output devices. Time-sharing operating systems were subsequently developed to allow multiple programs to run concurrently within a computer system and to begin to partition system resources to prevent programs from easily interfering with other programs' stored data and use of computational resources. Eventually, a wide variety of different types of computer-system partitioning were developed, to facilitate concurrent use of computer-system resources by multiple operating systems and very large numbers of users and application programs.

One type of computer-system partition is referred to as a "hard partition." Hard partitions are generally characterized by relatively static, hardware-based partitioning of a computer system. Distributed computer systems may, for example, be partitioned into single computers, or groups of computers, controlled by one or more operating systems or distributed operating systems for use by a particular set or class of users. A second type of computer-system partition is referred to as a "soft partition." Soft partitions are characterized by dynamic, software-based or firmware-based partitioning of both individual computers and groups of computers. A first type of soft partition is generally referred to as a virtual machine, created and maintained by a virtual-machine monitor. A virtual-machine monitor is a relatively complex control program that resides, in a common hierarchical abstraction of a computer system, between the hardware level and the operating system level. Virtual-machine monitors have full access to system resources and may include complex routines that use the system resources to carry out complex tasks on behalf of computer-system administrators and other privileged users that can issue commands to the virtual-machine monitor.

A second type of soft partition is referred to as a "virtual partition" or "VPAR." While a virtual-machine monitor is a generally persistent layer that continuously carries out tasks on behalf of guest operating systems and application programs running above the guest operating systems, a virtual-partition monitor, or "VPAR monitor," is generally implemented in firmware or as a combination of firmware and a very thin software layer to divide or partition resources within a single machine into hardware-based VPARs. An operating system can be installed and launched to run on each VPAR and to support multiple application programs. The VPAR monitor is primarily concerned with allocation of hardware resources, installation of an operating system, and launching of an operating system, and is generally inactive for much of the time during which the operating system, and application programs running above the operating systems, execute.

Modern virtual-machine monitors provide a variety of utilities and features, including the ability to move an active guest operating system between physical machines. Currently, active VPARs are tied to a specific machine, and VPAR monitors generally provide only a very small, rudimentary set of virtual-console commands that allow VPARs to be created, operating systems to be launched, and VPARs to be destroyed. However, VPARs generally provide much more efficient use of hardware resources by overlying operating systems than virtual monitors provide to guest operating systems. Thus, there are relatively stark tradeoffs between functionality and computational efficiency with regard to use of virtual monitors and VPARs. Computer manufacturers and vendors, and developers and vendors of operating systems and other support programs for computer systems, continue to develop both virtual-machine monitors and VPAR monitors to address disparities in functionality and efficiency between virtual machines and VPARs.

BRIEF DESCRIPTION OF THE DRAWINGS

FIG. 6 illustrates partitioning of computational resources by a VPAR monitor.

DETAILED DESCRIPTION OF THE INVENTION

Embodiments of the present invention are directed to enhancing VPAR monitors to allow an active VPAR to be moved from one machine to another, as well as to enhancing virtual-machine monitors to move active VPARs from one machine to another. Because traditional VPAR monitors lack access to many computational resources and to executingoperating-system state, VPAR movement is carried out primarily by specialized routines executing within active VPARs, unlike the movement of guest operating systems between machines carried out by virtual-machine-monitor routines.

Figure 1:
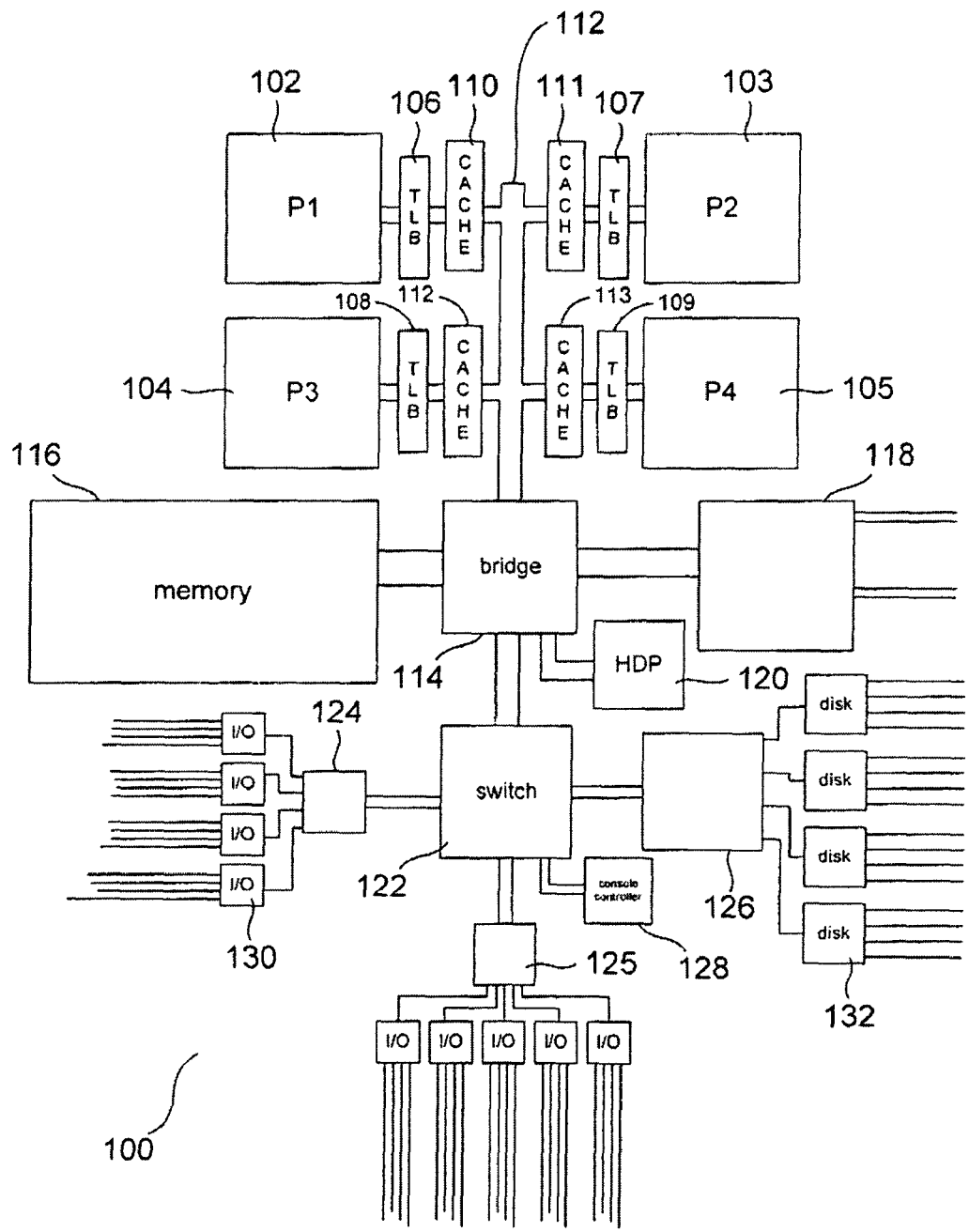
FIG. 1 provides a high-level visual description of the components of a computer.

FIG. 1 provides a high-level visual description of the components of a computer. The computer 100 includes four processors 102-105, each associated with a translation lookaside buffer ("TLB") and one or more memory caches 106-109 and 110-113, respectively, and all four interconnected through a high-speed bus 112 to a bridge device 114 that interconnects the processor bus with memory 116, a graphics processor 118, a hardware-dependent processor 120, and a switch device 122 through which processors and memory are interconnected to various high-level I/O busses or high-speed serial links 124-126 and a console controller 128. Each of the various components shown in FIG. 1, including a variety of I/O controllers, such as I/O controller 130, and disk controllers, such as disk controller 132, are themselves complex devices that would require many levels of hierarchical diagrams to describe. However, such details are outside the scope of the present invention.

The memory 116 shown in FIG. 1 may consist of many separate memory integrated circuits that are electrically interconnected and accessed through a memory controller. The processors, memory, I/O busses and high-speed serial links, console controller, and, in certain cases, individual disk controllers and I/O controllers are all considered to be computational resources that can be allocated among various soft partitions within a computer system, including both virtual machines provided by virtual-machine monitors and VPARs provided by VPAR monitors.

Figure 2:
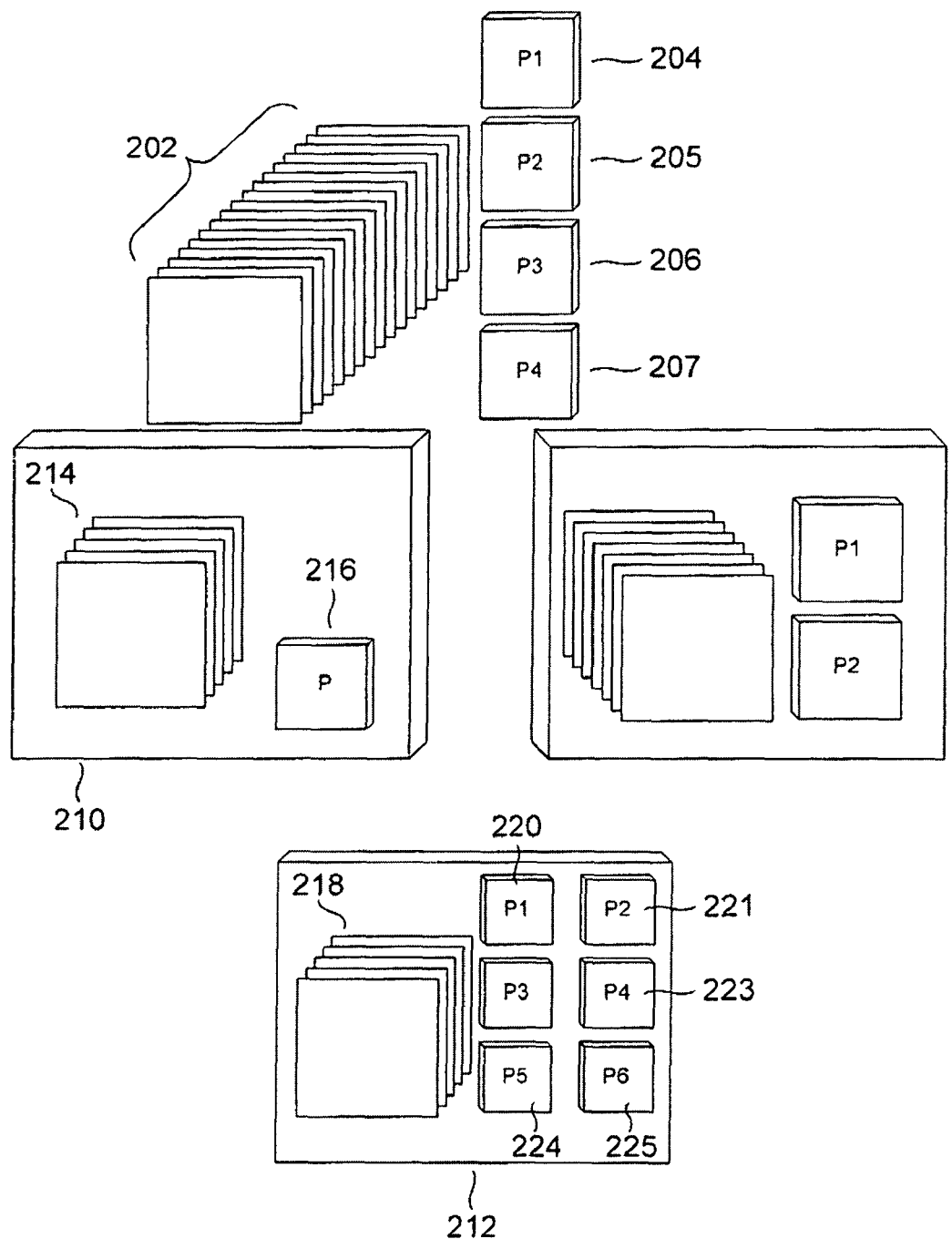
FIG. 2 illustrates the concept of a virtual machine.

FIG. 2 illustrates the concept of a virtual machine. As shown in FIG. 2, a particular computer system may include some large number of memory blocks 202 and four physical processors 204-207 of a first type. A virtual-machine monitor provides a virtual machine, such as virtual machines 210-212, to one or more guest operating systems. The virtual machine appears to the guest operating systems to include a collection of computational resources. For example, virtual machine 210 includes a modest number of memory blocks or partitions 214 and a single virtual processor 216 of a second type. By contrast, virtual machine 212 includes a modest amount of memory blocks or memory partitions 218 and six virtual processors 220-225 of a third type. In other words, a virtual-machine monitor may provide any of a large variety of different virtual-machine interfaces to one or more guest operating systems, with the virtual-machine interface mapped to, or implemented on, virtual hardware components of a physical machine. For example, processors 220-225 in virtual machine 212 are implemented by time-division multiplexing, or some other form of multiplexing, of the four hardware processors 204-207, with differences in architecture between the hardware physical processors of the first type and the virtual processors of the third type masked by virtual-machine-monitor emulation of features of the third type of processor not necessarily provided by the hardware processors. A virtual-machine monitor can therefore provide a virtual-machine interface that represents an entirely different type of hardware and hardware architecture than the hardware and hardware architecture on which the virtual machine is implemented. A virtual-machine monitor can, for example, provide a virtual machine interface of one vendor, to guest operating systems, but actually execute the guest operating systems on a computer system provided by a different vendor. A virtual machine can include a greater number, a fewer number, or the same number of computational resources as the underlying hardware system on which the virtual machine is implemented.

Figure 3:
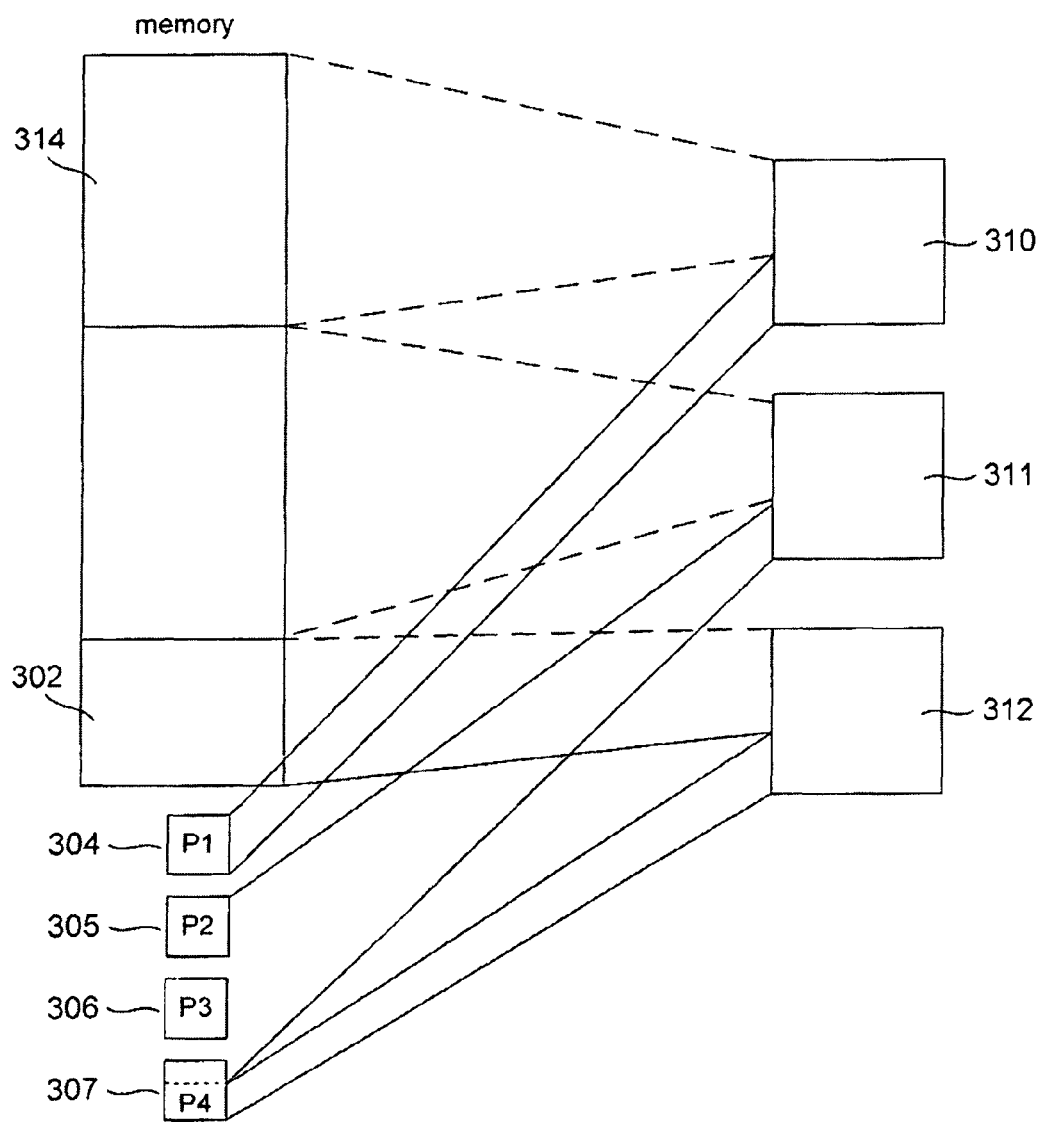
FIG. 3 illustrates allocation of memory and processor resources to three virtual machines by a virtual-machine monitor.

FIG. 3 illustrates allocation of memory and processor resources to three virtual machines by a virtual-machine monitor. In FIG. 3, a large rectangle 302 represents the full memory resources and four smaller rectangles 304-307 represent the processor resources of a physical computer system. Three virtual machines 310-312 are represented by squares on the right-hand side of FIG. 3. Virtual-machine 310 executes on processor P1 304 and uses a first region 314 of the physical memory 302. By contrast, virtual machine 311 is implemented on, or executes on, processors P2 and P3 (305-306 in FIG. 3) as well as on processor P4 307, which virtual machine 311 shares with virtual machine 312. Thus, a virtual-machine monitor may allocate one or more entire computational resources to a particular virtual machine, or may share particular computational resources among two or more virtual machines.

Figure 4:
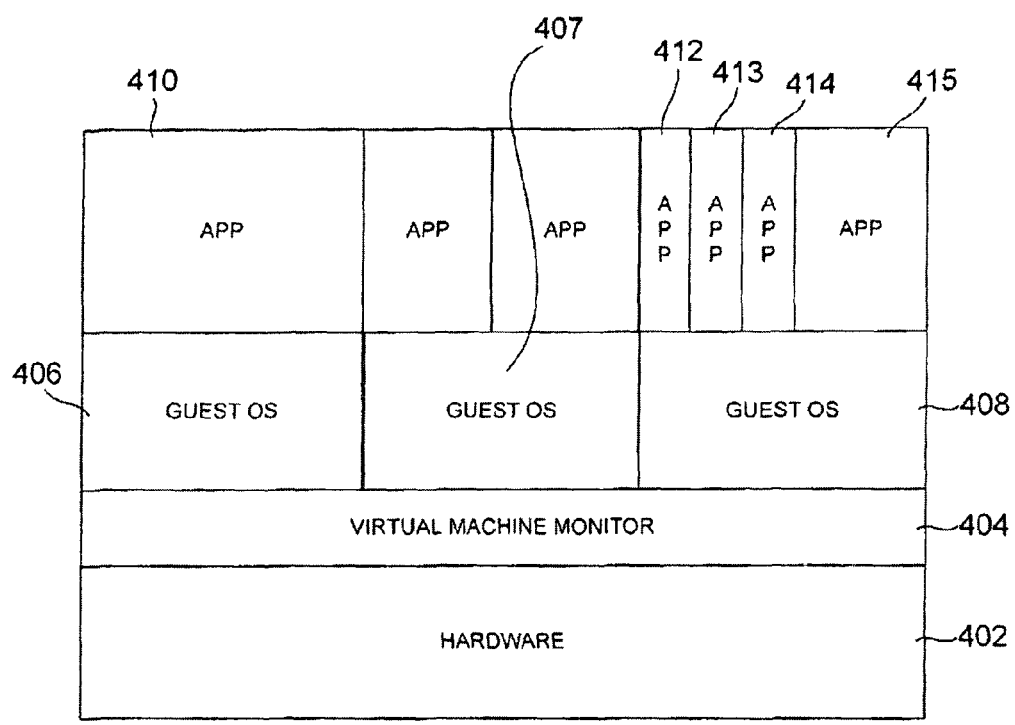
FIG. 4 illustrates the position of a virtual-machine monitor within a common hierarchical abstraction of a computer system.

FIG. 4 illustrates the position of a virtual-machine monitor within a common hierarchical abstraction of a computer system. In FIG. 4, a lower layer 402 represents the physical hardware of a computer system. The virtual-machine monitor 404 is a first firmware/software layer above the hardware level, and supports execution of one or more guest operating systems 406-408, each of which, in turn, provides a computational environment for execution of one or more application programs. For example, guest operating system 406 supports a single application program 410 while guest operating system 408 supports execution of four application programs 412-415. The virtual-machine monitor may provide a different virtual-machine interface to each of the guest operating systems.

Figure 5A:
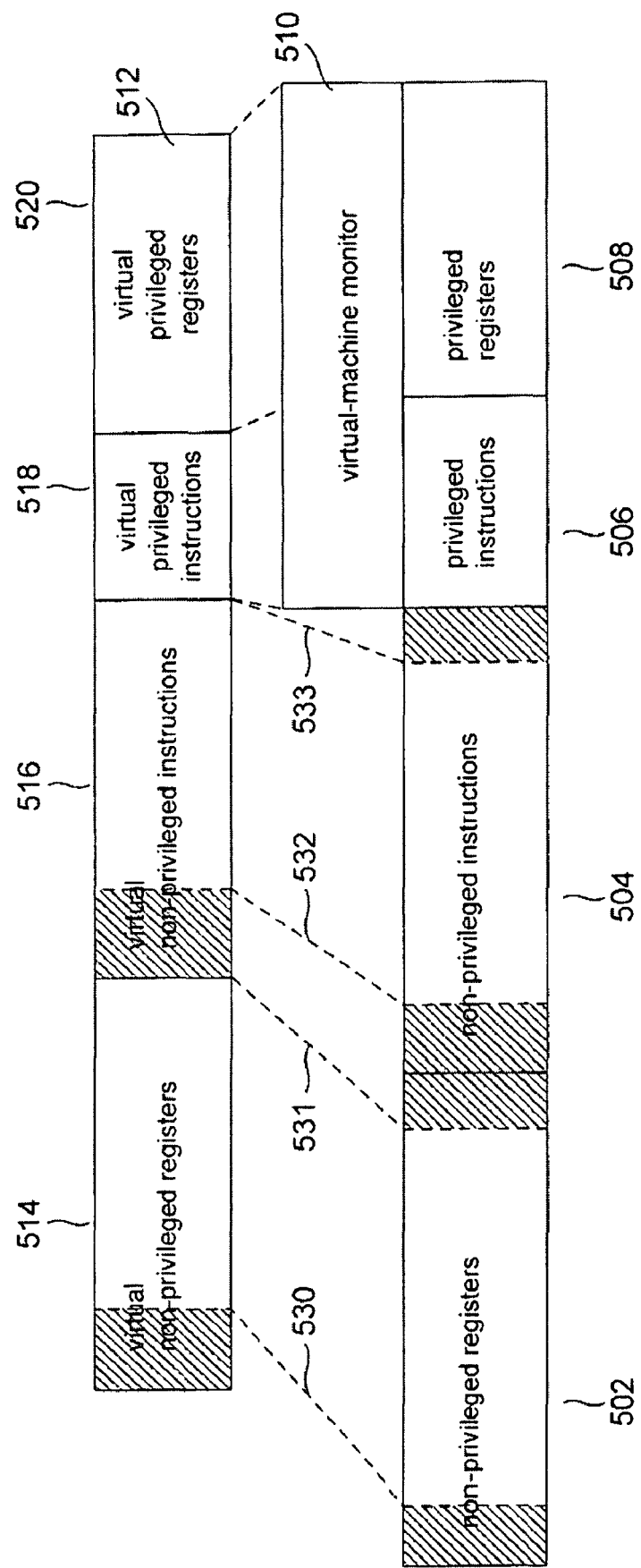
FIGS. 5A-D illustrate operation of a virtual-machine monitor.
Figure 5B:
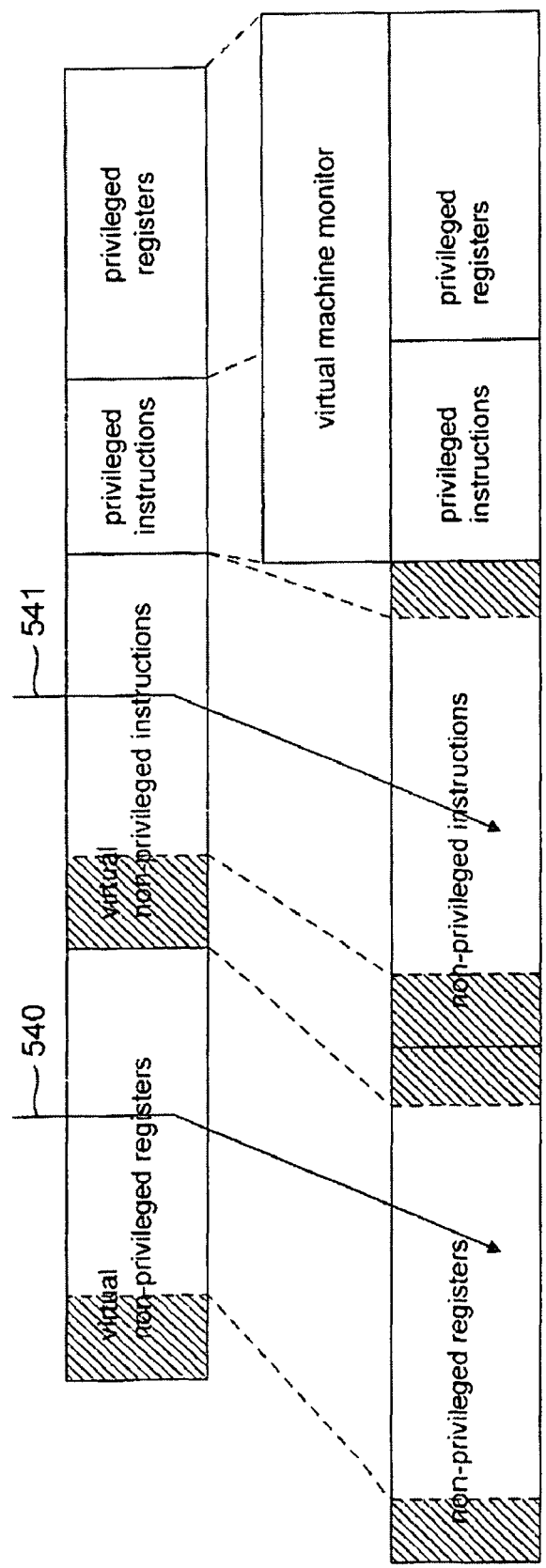
Figure 5C:
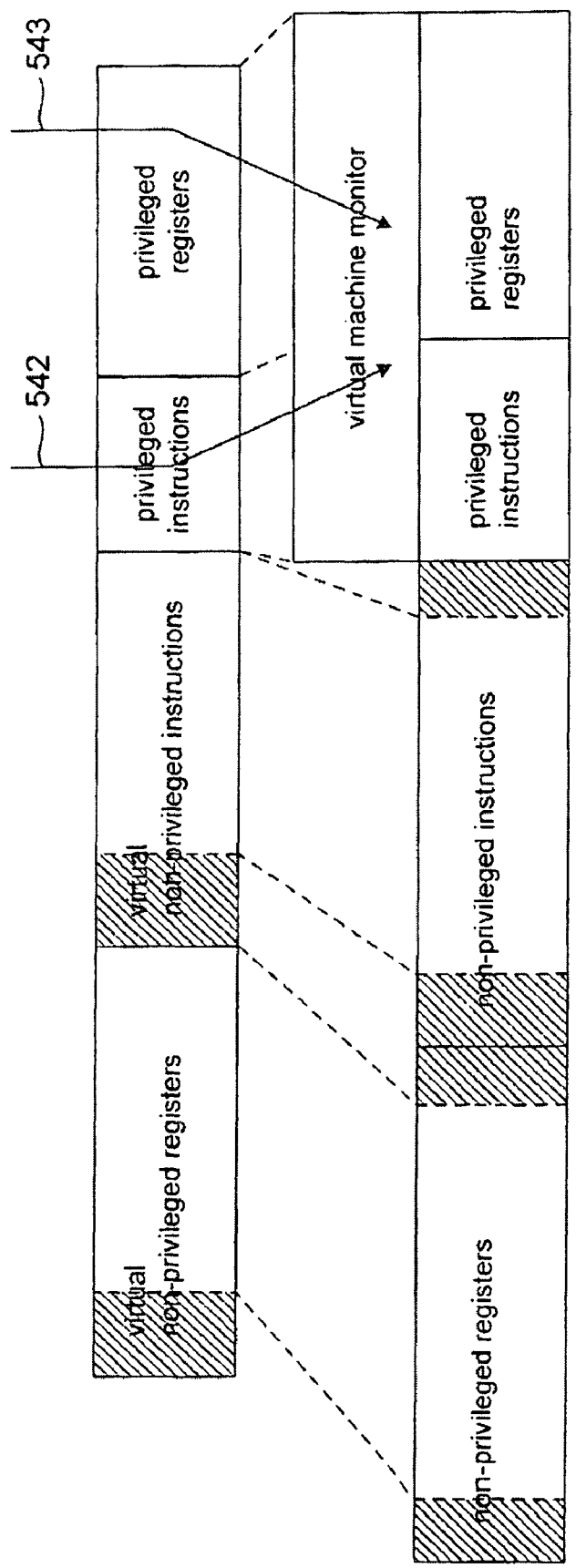
Figure 5D:
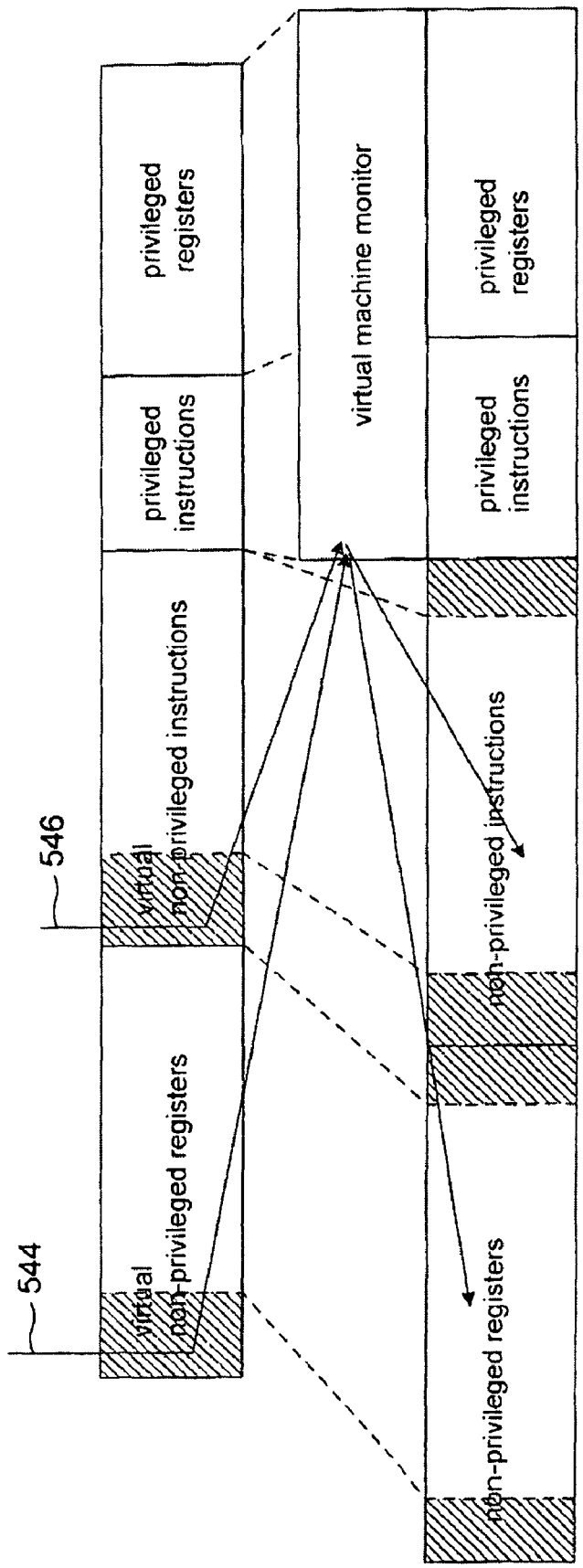

FIGS. 5A-D illustrate operation of a virtual-machine monitor. From the standpoint of an operating system, the hardware layer of a physical computer system is viewed as a set of non-privileged registers, 502, a set of non-privileged instructions 504, a set of privileged instructions 506, and a set of privileged registers 508. In a traditional computer system, in which an operating system executes directly above the hardware, privileged instructions and privileged registers are usually exclusively accessed by an operating-system kernel, while the operating system allows application programs to directly access non-privileged registers and non-privileged instructions. As mentioned above, the virtual-machine monitor 510 executes, in the hierarchical abstraction of a computer system, directly above the hardware level, and provides one or more virtual machines 512 to guest operating systems, each virtual machine comprising a virtual set of non-privileged registers 514, a virtual set of non-privileged instructions 516, a virtual set of privileged instructions 518, and a virtual set of privileged registers 520. The virtual registers and instructions may be different than the actual, underlying, physical registers and instructions of the hardware layer. In general, some set of the virtual non-privileged registers may map directly to a corresponding set of hardware non-privileged registers, as shown by the mapping represented by dashed lines 530-531 in FIG. 5A, and some set of the virtual non-privileged instructions may directly map to a corresponding set of hardware non-privileged instructions, as indicated by dashed lines 532-533 in FIG. 5A. Whether or not the virtual privileged instructions and registers map to underlying hardware privileged instructions and registers is, in general, irrelevant. As shown in FIG. 5B, a virtual-machine monitor generally allows applications programs to directly access non-privileged registers and non-privileged instructions to which virtual non-privileged registers and virtual non-privileged instructions directly map, as indicated by arrows 540 and 541 in FIG. 5B. In other words, the virtual-machine monitor does not intervene in execution of non-privileged instructions or access to non-privileged registers by guest operating systems and overlying application programs, providing that these virtual non-privileged instructions and virtual non-privileged registers directly map to underlying hardware registers and instructions. However, as shown in FIG. 5C, all accesses by guest operating systems to privileged instructions 542 and privileged registers 543 are generally trapped by the virtual-machine monitor. The virtual-machine monitor may choose to emulate execution of privileged instructions or privileged registers, on behalf of guest operating systems, or may execute corresponding hardware privileged instructions and provide access to hardware privileged registers, but do so only when safe execution and access can be ensured by the virtual-machine monitor. As shown in FIG. 5D, when a guest operating system or overlying application program attempts to access virtual non-privileged registers 544 or execute virtual non-privileged instructions 546 that do not directly map to underlying physical registers and instructions, the virtual-machine monitor intercepts the attempted access or execution and emulates the access or execution on behalf of the guest operating systems or overlying application programs. As one example, a virtual-machine monitor may provide a virtual machine with a larger set of non-privileged registers than provided by the underlying hardware. The virtual-machine monitor may simulate the larger register set by storing register values in memory, and swapping register values in and out of actual physical hardware registers on an as-needed basis, similar to virtual memory provided by operating systems to application programs, with virtual memory pages swapped between physical memory and mass-storage devices.

FIG. 6 illustrates partitioning of computational resources by a VPAR monitor. In FIG. 6, the physical computer system is shown to include four processors 602-605, a large memory address base 606, and four high-level I/O busses or high-speed serial interconnects 608-611. As shown by dashed lines in FIG. 6, a VPAR monitor may partition these resources and allocate the partitions to different VPARs. In FIG. 6, for example, a first VPAR, VPAR 1, is allocated processor 602, a portion of the physical memory 614, and a high-level I/O bus or serial link 608. VPAR 2, by contrast, is allocated processors 603 and 604, a portion of physical memory between dashed line 616 and dashed line 618, and another I/O bus or high-speed serial-link route 609. In contrast to virtual-machine monitors, which can provide generally arbitrary virtual machines to guest operating systems and multiplex computational resources among guest operating systems, the VPAR monitor essentially allocates each particular hardware resource exclusively to one VPAR. In general, two VPARs cannot share a single processor. The VPAR monitor generally does not multiplex computational resources among VPARs, but simply allocates hardware resources to VPARs.

Figure 7:
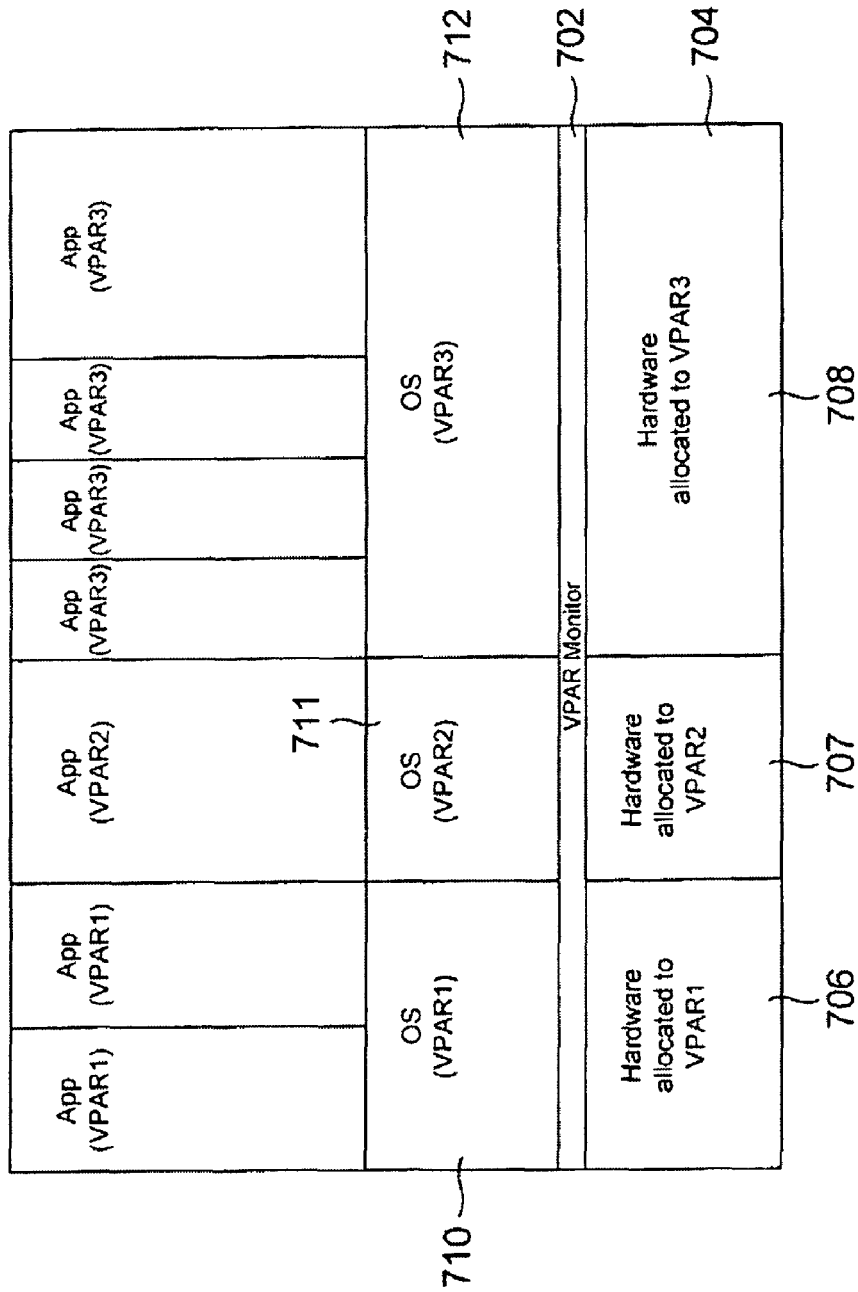
FIG. 7 illustrates, in a style similar to that used in FIG. 4, the position of a VPAR monitor within a common hierarchical abstraction of a computer system.

FIG. 7 illustrates, in a style similar to that used in FIG. 4, the position of a VPAR monitor within a common hierarchical abstraction of a computer system. The VPAR monitor 702 executes, generally as firmware or a combination of firmware and software, directly above the hardware layer 704. However, unlike the case of a virtual-machine monitor, the VPAR monitor partitions the underlying hardware into hardware partitions 706-708, each of which supports execution of an operating system, such as operating systems 710-712, each operating system, in turn, supporting execution of one or more application programs. The VPAR monitor sets up the environment in which the operating system is to run, but does not generally emulate machine resources.

Figure 8:
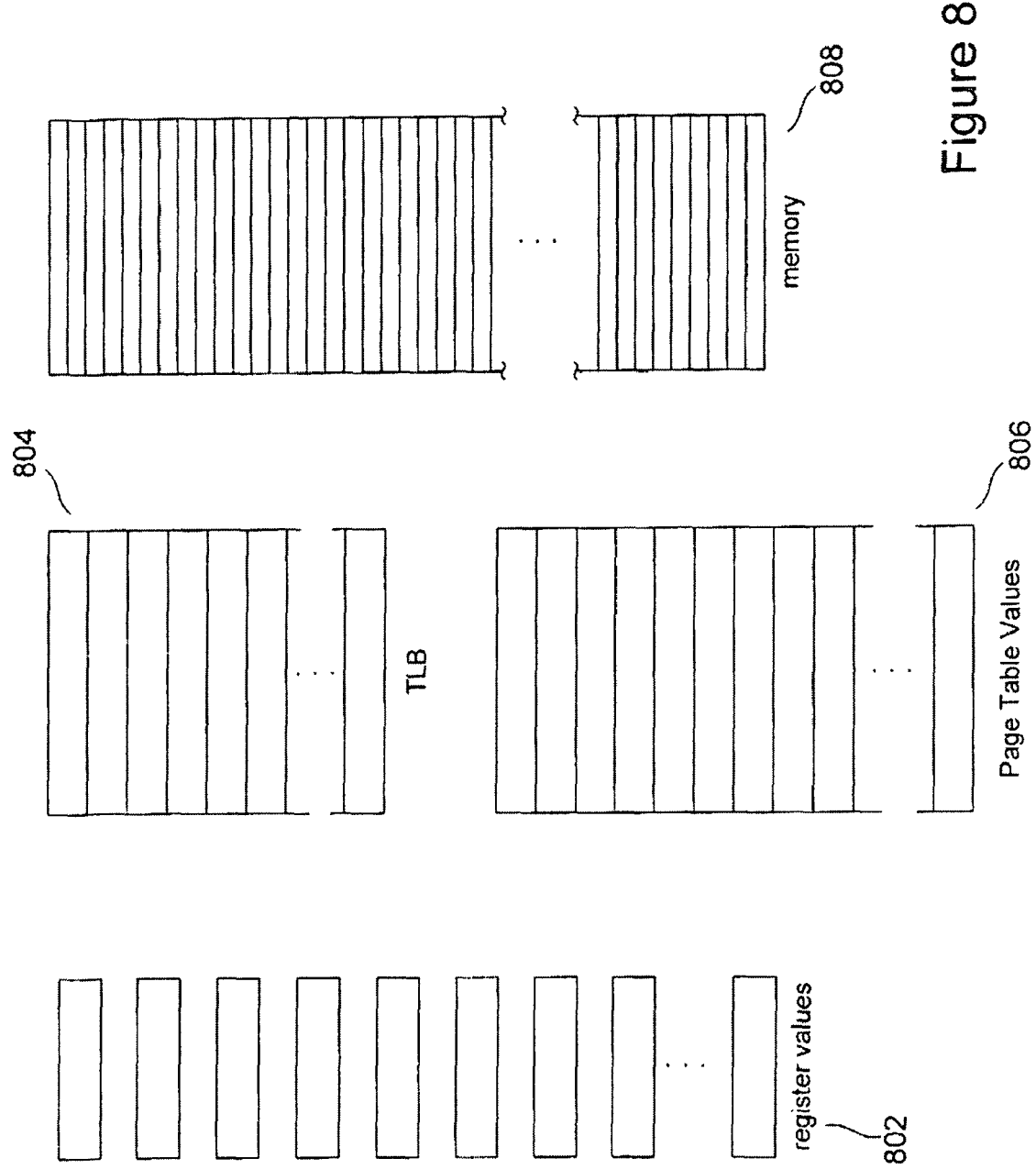
FIG. 8 illustrates various components of the state of an executing operating system.

FIG. 8 illustrates various components of the state of an executing operating system. The state of an operating system includes the contents of register values 802, the contents of the translation lookaside buffer ("TLB") 804 that contains virtual-memory-to-physical-memory translations, the contents of a page table 806 for a virtual-memory-management subsystem, and the contents of memory 808. When a operating system executes directly on hardware, the register values, TLB-entry values, page-table-entry values, and memory values all reside in physical computational resources, including processor registers and memory.

Figure 9:
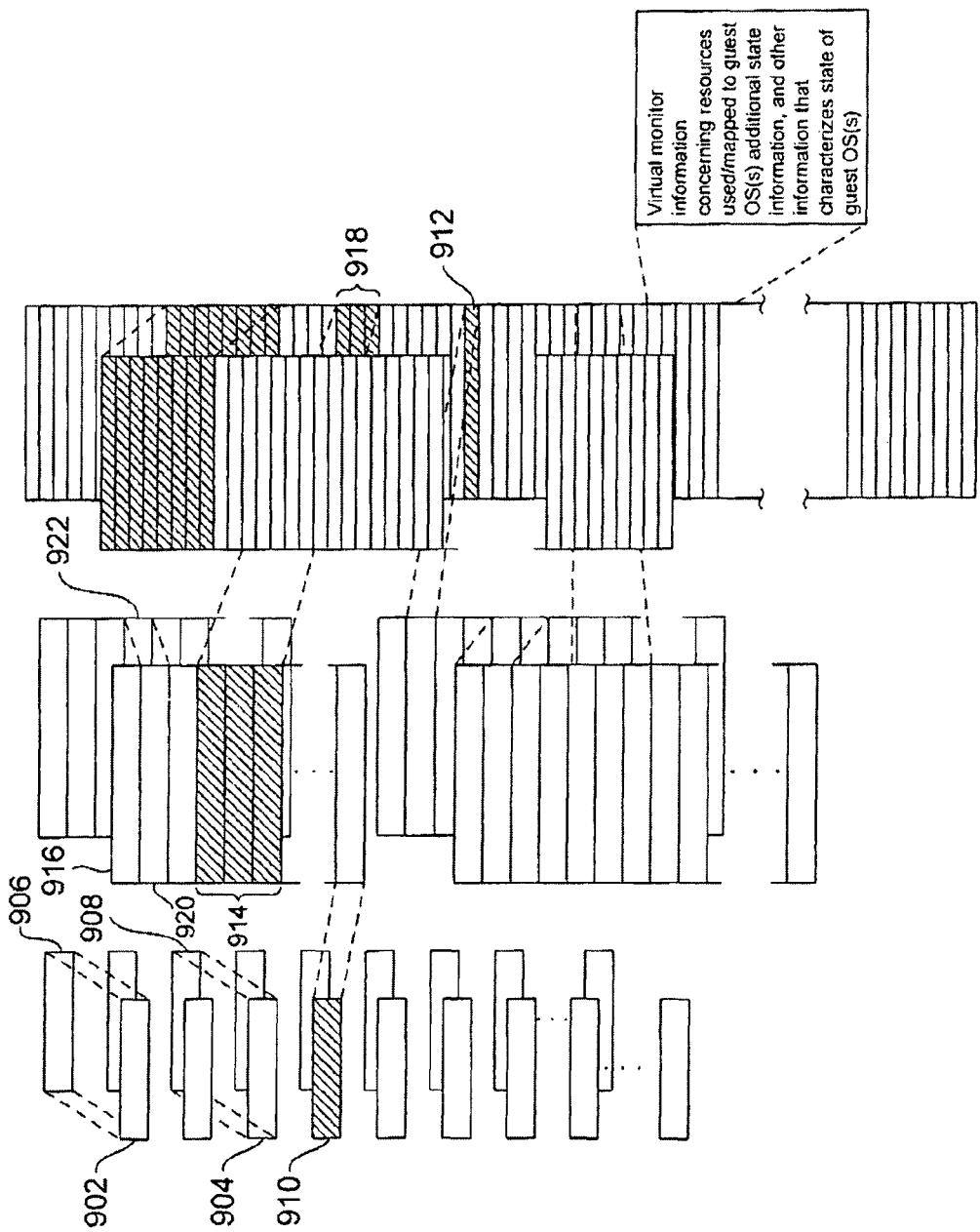
FIG. 9 illustrates various components of the state of a guest operating system executing above a virtual machine.

FIG. 9 illustrates various components of the state of a guest operating system executing above a virtual machine. In the case of a guest operating system, the guest operating system views its execution state just as an operating system executing on top of physical hardware views its execution state, as shown in FIG. 8. However, as shown in FIG. 9, the registers, TLB cache, page table, and memory provided by a virtual-machine monitor to a guest operating system are generally mapped to underlying physical registers and memory. For example, as shown in FIG. 9, two virtual-machine registers 902 and 904 are directly mapped to two corresponding, underlying physical registers 906 and 908, while, by contrast, virtual-machine register 910 is mapped to physical memory 912. Similarly, a number of entries 914 in the virtual-machine TLB 916 are mapped to corresponding physical memory locations 918 while TLB entry 920 is directly mapped to an underlying physical TLB entry 922. The mappings of virtual-machine registers, TLB entries, page-table entries, and memory to underlying physical computational resources may be quite dynamic, in some cases changing at the frequency of instruction execution.

In the case of a VPAR, the current state of the operating system executing within the VPAR generally comprises data stored in physical registers and in physical memory, along with the actual hardware allocation provided by the VPAR monitor to the VPAR, as shown in FIG. 6. By contrast, the state of a guest operating system executing above a virtual machine includes the guest operating system's view of its state, including the virtual registers, virtual TLB entries, virtual page-table entries, and virtual memory contents provided by the virtual-machine monitor to the virtual machine, as well as the mappings of the virtual computational resources to physical computational resources. These mappings may include mappings of virtual registers to physical registers, mapping of virtual registers to memory locations, and mapping of virtual-machine virtual addresses to virtual-machine physical addresses which are, in turn, mapped to physical-machine virtual addresses and/or physical-machine physical addresses. The exact nature of these mappings vary significantly from one virtual-machine monitor to another, and from virtual machine to virtual machine.

Figure 10:
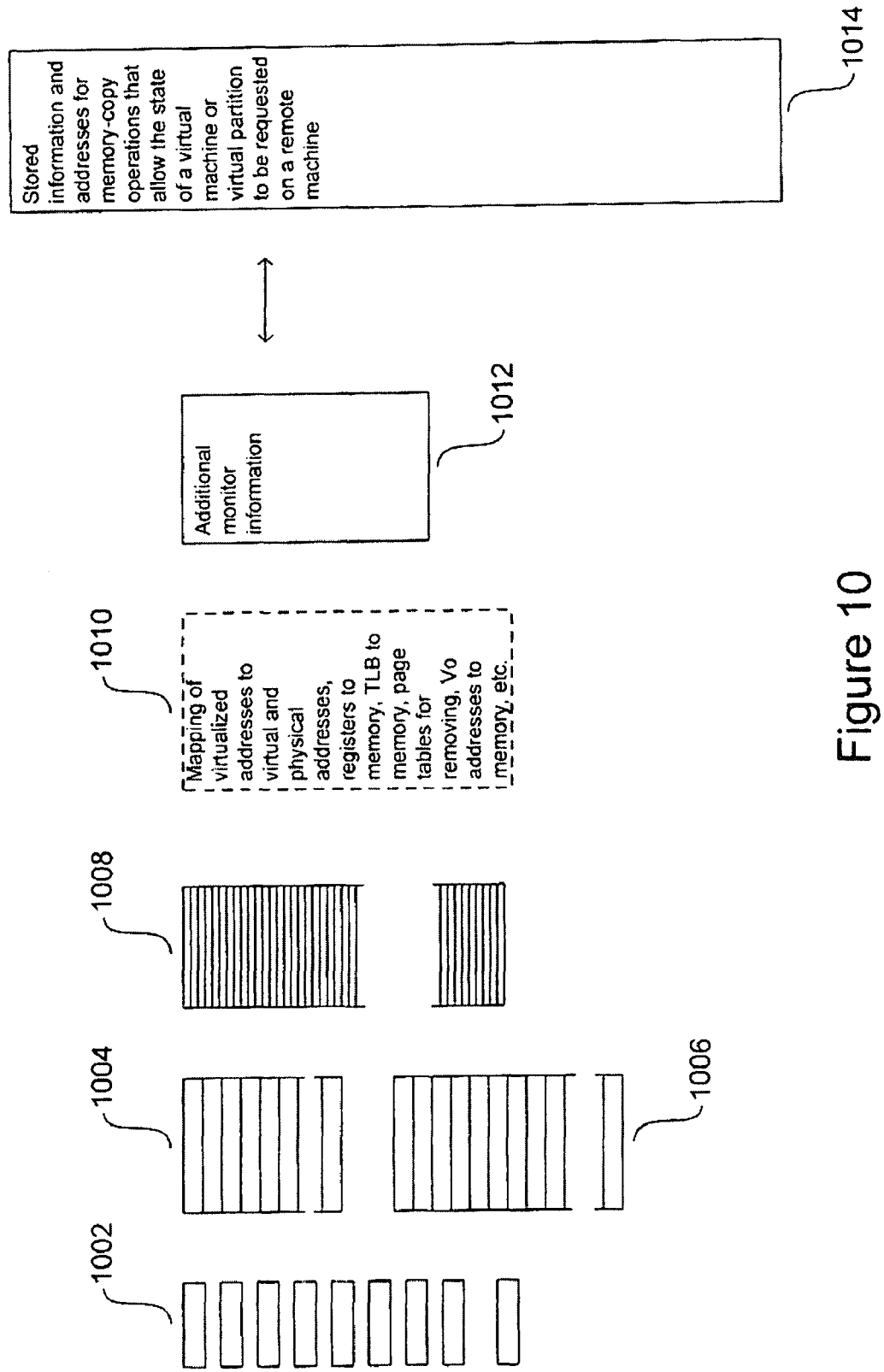
FIG. 10 illustrates encapsulation of the state of an operating system executing within a VPAR or a guest operating system executing above a virtual machine as an image of the executing operating system or guest operating system, respectively.

FIG. 10 illustrates encapsulation of the state of an operating system executing within a VPAR or a guest operating system executing above a virtual machine as an image of the executing operating system or guest operating system, respectively. As shown in FIG. 10, the state of an operating system or guest operating system includes register values 1002, TLB-entry values 1004, page-table-entry values 1006, the contents of memory 1008, and, in the case of a guest operating system, mappings of virtualized addresses to virtual and physical addresses of an underlying computer system, mappings of registers to memory, and other such mappings 1010. In addition, the state of an operating system executing within a VPAR or a guest operating system executing above a virtual machine includes additional monitor-specific information 1012. In the case of an operating system executing within a VPAR, this additional information is primarily an encoding of the hardware-resource allocation to the VPAR, while, in the case of a virtual-machine monitor, this additional information may include a specification of the virtual-machine interface to which the guest operating system logically interfaces.

The state information for an operating system executing within a VPAR or a guest operating system executing above a virtual machine can be collected together and stored in a formatted file 1014, so that, at any given point in time, the state of an executing operating system or guest operating system can be captured and stored as data. This data can then be used to recover that state at a later time. The state-capturing information 1014 may include register values, TLB-entry values, and other such values, as well as virtualized memory to virtual and physical memory translations. This information may also include the full contents of memory, or, more often, specification of a range of memory addresses and/or memory-copy instructions to allow the contents of memory used by a VPAR or perceived by a guest operating system to be copied into, for example, the memory of another computer system.

Figure 11A:
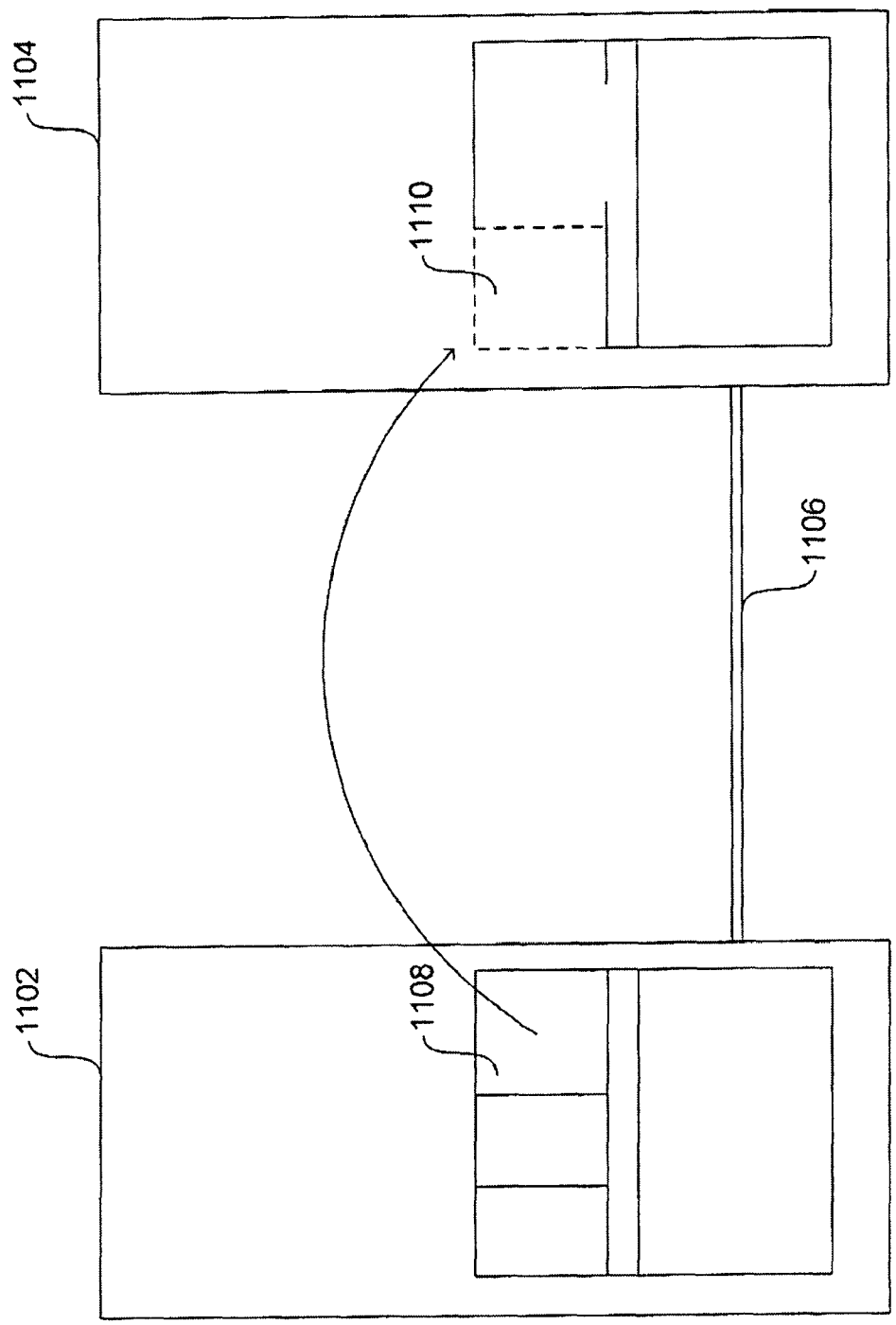
FIGS. 11A-C illustrate active soft-partition movement between machines, including VPAR movement, which represents one embodiment of the present invention.
Figure 11B:
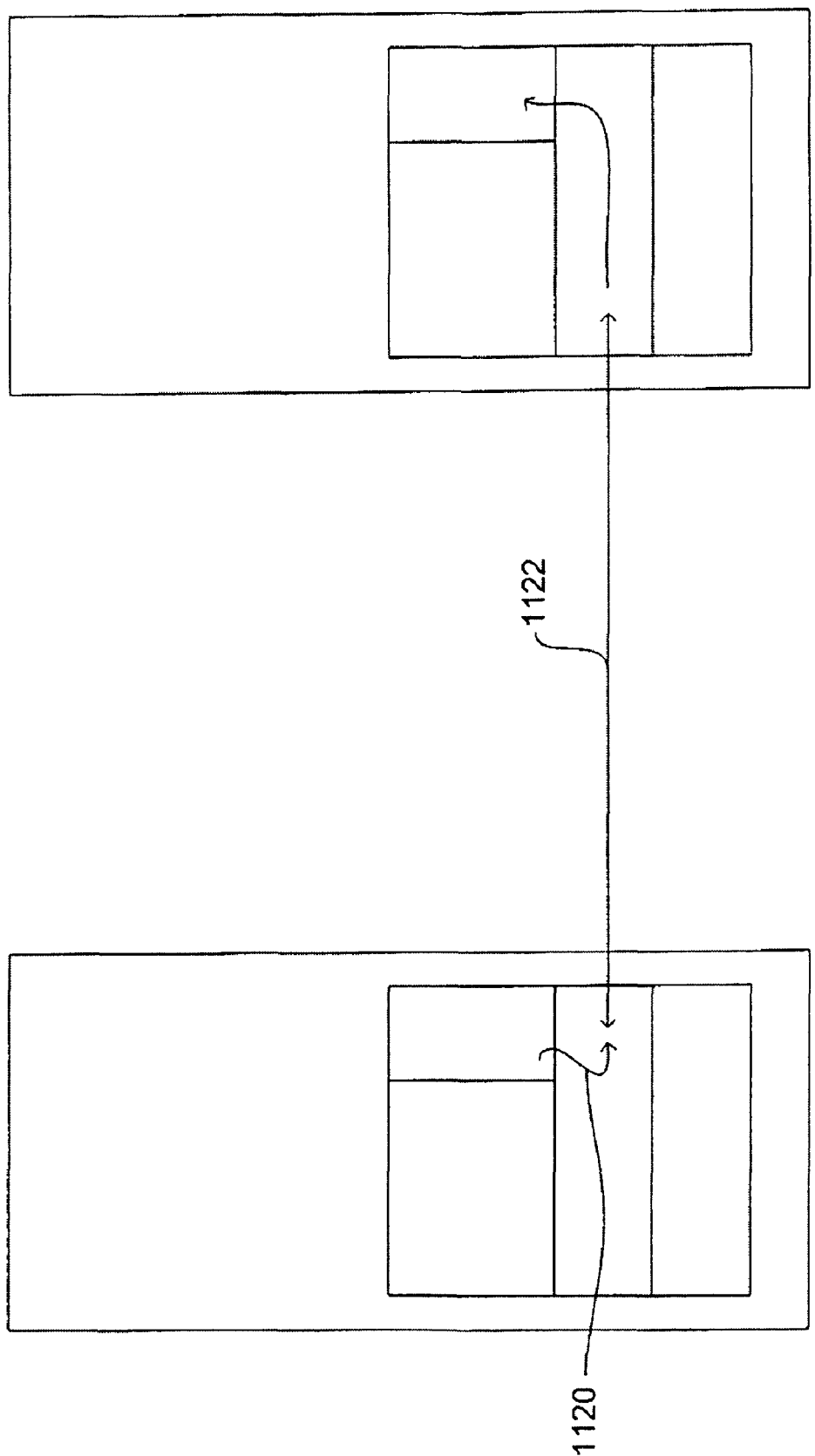
Figure 11C:
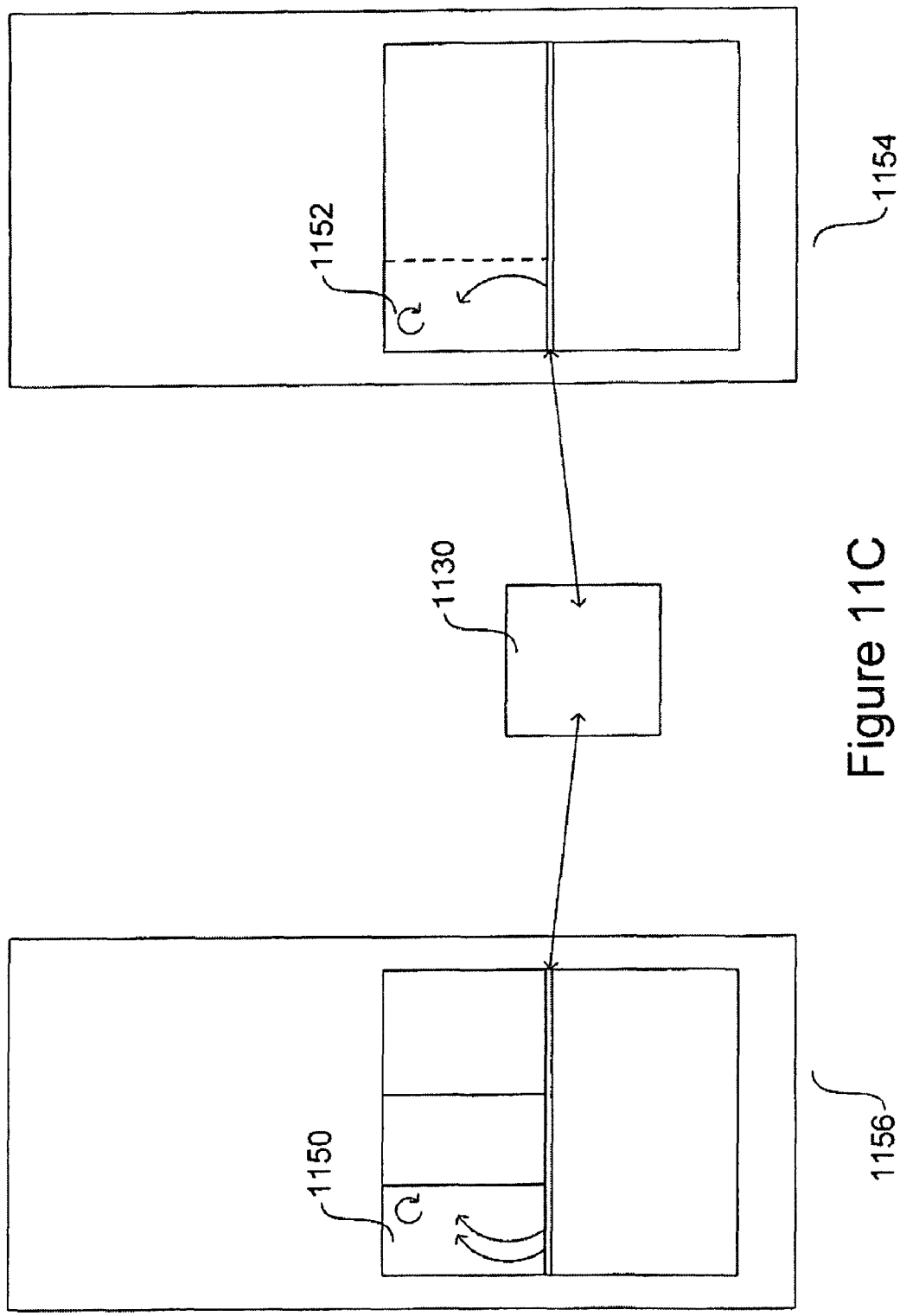

FIGS. 11A-C illustrate active soft-partition movement between machines, including VPAR movement, which represents one embodiment of the present invention. FIG. 11A shows the general soft-partition movement operation. In FIG. 11A, as in FIGS. 11B-C, two different physical computer systems 1102 and 1104 are shown to be interconnected by a communications medium 1106. Soft-partition movement involves selecting an active soft partition 1108 on a first physical computer system 1102 to move, placing the active soft partition into a quiescent state, transferring the soft partition to an empty soft-partition slot 1110 of a different, target, physical computer system 1104, and resuming execution of the soft partition on the target computer system, including execution of all application programs supported by one or more operating systems or guest operating systems.

As shown in FIG. 11B, movement of executing guest operating systems between physical machines is a feature provided by certain virtual-machine monitors. Because a virtual-machine monitor actively manages the state of a guest operating system on a continuous basis, including mapping virtualized memory addresses to physical and virtual addresses of the underlying hardware and creating and maintaining register-to-register and register-to-memory mappings, and because a virtual-machine monitor may multiplex hardware resources, including processor resources, among guest operating systems, a virtual-machine monitor running on a first computer can quiesce, or freeze, execution of a guest operating system, capture the state of the guest operating system, as indicated by arrow 1120 in FIG. 11B, transport the state information to a virtual-machine monitor on a second, target machine, as represented by horizontal arrow 1122 in FIG. 11B. The virtual-machine monitor on the target computer provides a virtual-machine interface for resumption of execution of the guest operating system or guest operating systems and reconstitutes the state of the guest operating system that was formerly executing on the initial computer system by re-mapping virtual computational resources to computational resources of the remote machine and restoring all of the various register, TLB-entry, page-table-entry, and memory values, including copying memory from the initial machine to the target machine, according to the image, provided by the virtual-machine monitor running on the first computer, that encapsulates the execution state of the guest operating system, as discussed above with reference to FIG. 10. The virtual-machine monitor on the first computer, having access to the full hardware resources of the computer on which it executes, can employ low-level communications and I/O routines in order to save the execution state of one or more guest operating systems and transmit the saved state, as a guest-operating-system image, to the machine for resumption of execution on the target machine.

By contrast, a much different approach needs to be taken in the case of moving a VPAR from one machine to another, as shown in FIG. 11C, according to various embodiments of the present invention. As discussed above, the VPAR monitor does not continuously execute, and does not have access to computational resources needed to capture the execution state of an operating-system in an image and transmit the operating-system-execution-state image to a remote machine. Instead, other means must be employed to effect VPAR movement between physical machines.

In general, the VPAR monitor is accessed via a console 1130. The console may be a physical I/O device or a virtual console instantiated on an external computer or accessed through a monitor. In many implementations, a virtual console interface is provided to each VPAR within a physical machine, so that a system administrator or other privileged user can access a particular VPAR through an associated virtual console. In one embodiment of the present invention, the virtual console is extended to provided virtual-console interfaces to VPARs and to VPAR monitors on multiple machines. Movement of an active operating system within an active VPAR on one machine 1150 to a VPAR on a different machine 1152 is carried out, according to one embodiment of the present invention, as follows. First, a virtual console is opened to the VPAR monitor of the target machine 1154 in order to create an appropriate VPAR on that machine within which the operating system can be instantiated. Next, a virtual console is opened to the originating machine 1156 in order to issue several commands to the operating system and VPAR to be moved. First, the operating system or VPAR is instructed to quiesce, in order to prepare for capture of the state of the operating system, or, in other words, preparation of an operating-system-execution image. Once quiesced, a command is issued through the virtual console to execute image capture. An image-capture routine or routines may be included within the VPAR, may be configured upon VPAR initialization, may be downloaded to the VPAR in preparation for image capture, or may be included in the operating system or made available through the operating system's file system. The image-capture routine or routines are launched in order to prepare an operating-system image for the operating system currently executing within the VPAR. After the image is prepared, an image-transfer routine is invoked within the new VPAR 1152 on the target machine 1154 to move the image from the remote machine to the target machine and, in certain cases, additionally copy contents of portions of the originating machine's memory to the target machine. Alternatively, rather than a pull operation, the information may be moved from the originating machine to the target machine via a push operation carried out by image-transferring routines executing in the VPAR 1150 of the originating machine. In either case, once the image is successively transferred to the VPAR, the operating system is re-launched in the new VPAR by a command through the virtual console to the VPAR monitor of the target machine, the operating system recovering the state captured in the image. Operating-system-execution resumption may involve only specialized routines temporarily loaded into the new VPAR, may involve a combination of specialized VPAR routines along with operating-system routines, or may involve only operating-system routines.

Figure 12A:
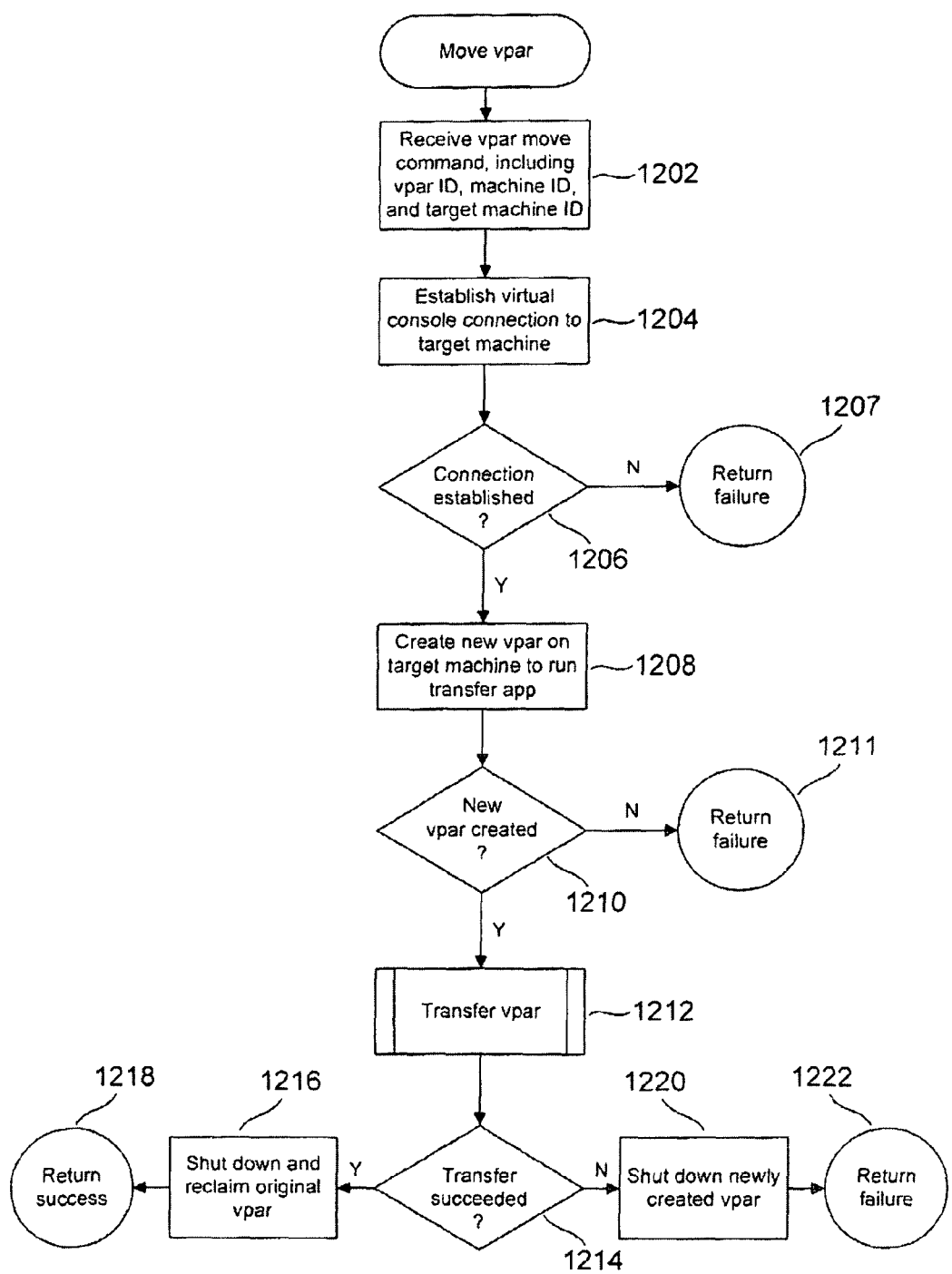
FIGS. 12A-B provide control-flow diagrams for active VPAR movement between physical machines that represents one embodiment of the present invention.
Figure 12B:
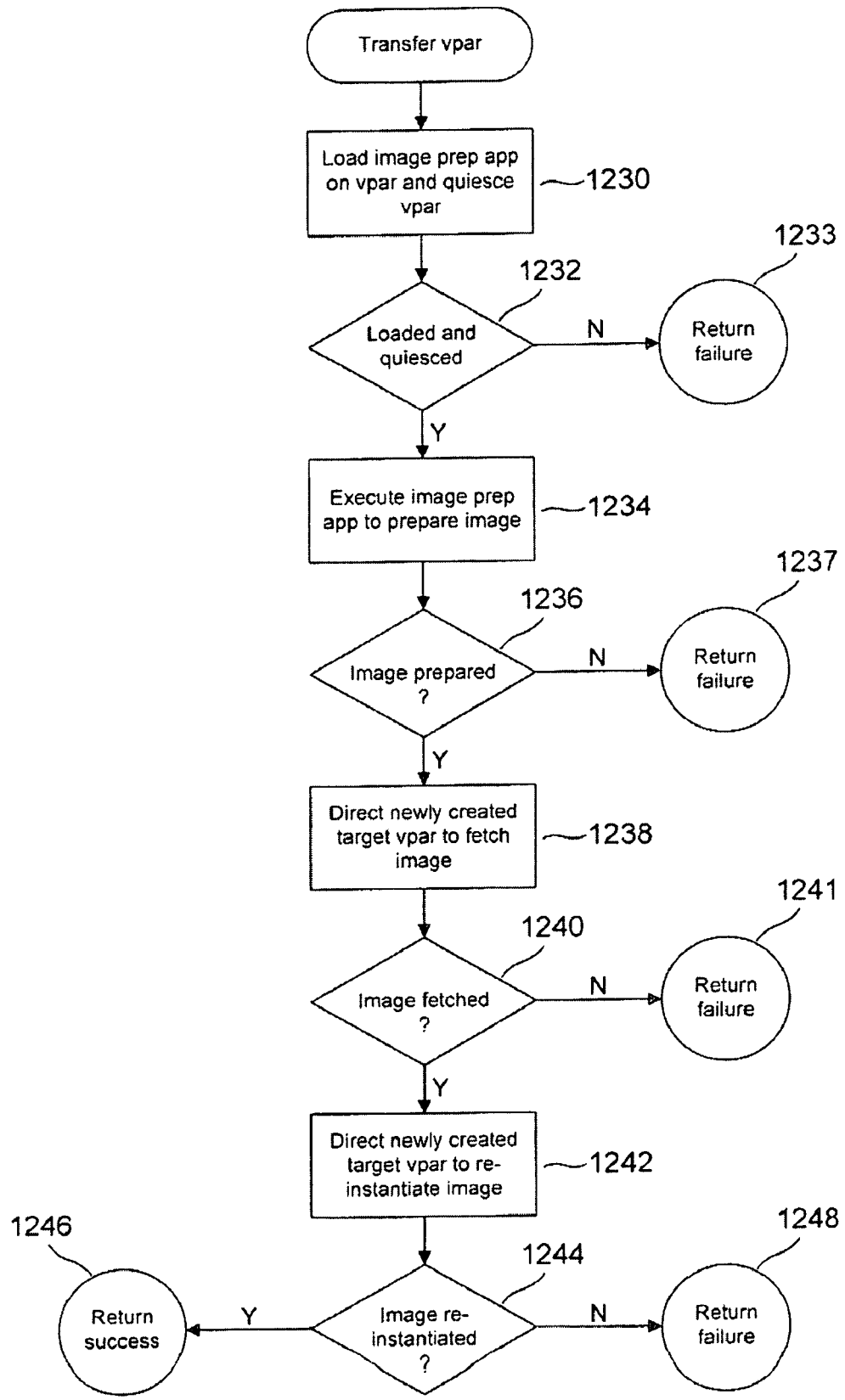

FIGS. 12A-B provide control-flow diagrams for active VPAR movement between physical machines that represents one embodiment of the present invention. FIG. 12A provides a portion of the VPAR-movement logic referred to as routine "move vpar," including a call to a routine "transfer VPAR" 1212, a control-flow diagram for which is shown in FIG. 12B. In step 1202, a VPAR-move command is received, including identification of the VPAR to be moved and an identification of the target machine. In step 1204, a virtual-console connection is established to the target machine. If a connection cannot be successfully established, as determined in step 1206, then a failure is returned in step 1207. Connection may not be established for a variety of different reasons, including a lack of virtual-console facilities on the target machine or lack of VPAR monitor on the target machine. When connection is established, then, in step 1208, virtual-console commands are employed to create a new VPAR on the target machine to which the VPAR to be moved is to be transferred. If the new VPAR cannot be created, as determined in step 1210, then failure is returned in step 1211. The new VPAR may not be able to be created because of lack of available hardware resources on the target machine, or for a variety of other reasons. When a new VPAR has been created, then the routine "transferVPAR" is invoked, in step 1212, in order to capture and transfer an operating-system image from the VPAR to be moved to the new VPAR created on the target machine. If the transfer succeeds, as determined in step 1214, then the VPAR that was moved is shut down and reclaimed on the original machine, in step 1216, and success is returned in step 1218. Otherwise, the newly created VPAR is shut down, in step 1220, and failure is returned in step 1222. In the event of failure for any reason, the original VPAR can be reactivated.

FIG. 12B provides a control-flow diagram for the routine "transfer vpar" called in step 1212 of the routine "moveVPAR" shown in FIG. 12A. In step 1230, an image-capture routine is loaded on the VPAR to be moved and a command is issued to the VPAR to quiesce the operating system and application programs above the operating system on the VPAR. If the image-capture application is not successfully loaded and the VPAR not successfully quiesced, as determined in step 1232, then failure is returned in step 1233. Otherwise, in step 1234, the image-capture application or routine is executed within the VPAR to prepare an operating-system-execution-state image. In general, the operating-system-execution-state image is prepared as data encoded in memory and/or stored in one or more mass-storage devices. If the image is not successfully prepared, as determined in step 1236, then failure is returned in step 1237. Otherwise, in step 1238, an image-transfer routine is loaded into the new VPAR and invoked to transfer the image from the VPAR to be moved, on the originating machine, to the new VPAR on the target machine. If the image is not successfully transferred, as determined in step 1240, then failure is returned in step 1241. Otherwise, in step 1242, the operating system is reinstantiated within the new VPAR by either a reinstantiation routine loaded within the VPAR upon VPAR creation or by a combination of operating-system-reinstantiation routines and operating-system routines. If the operating system is successfully reinstantiated, as determined in step 1244, then success is returned in step 1246. Otherwise, failure is returned in step 1248.

Figure 13:
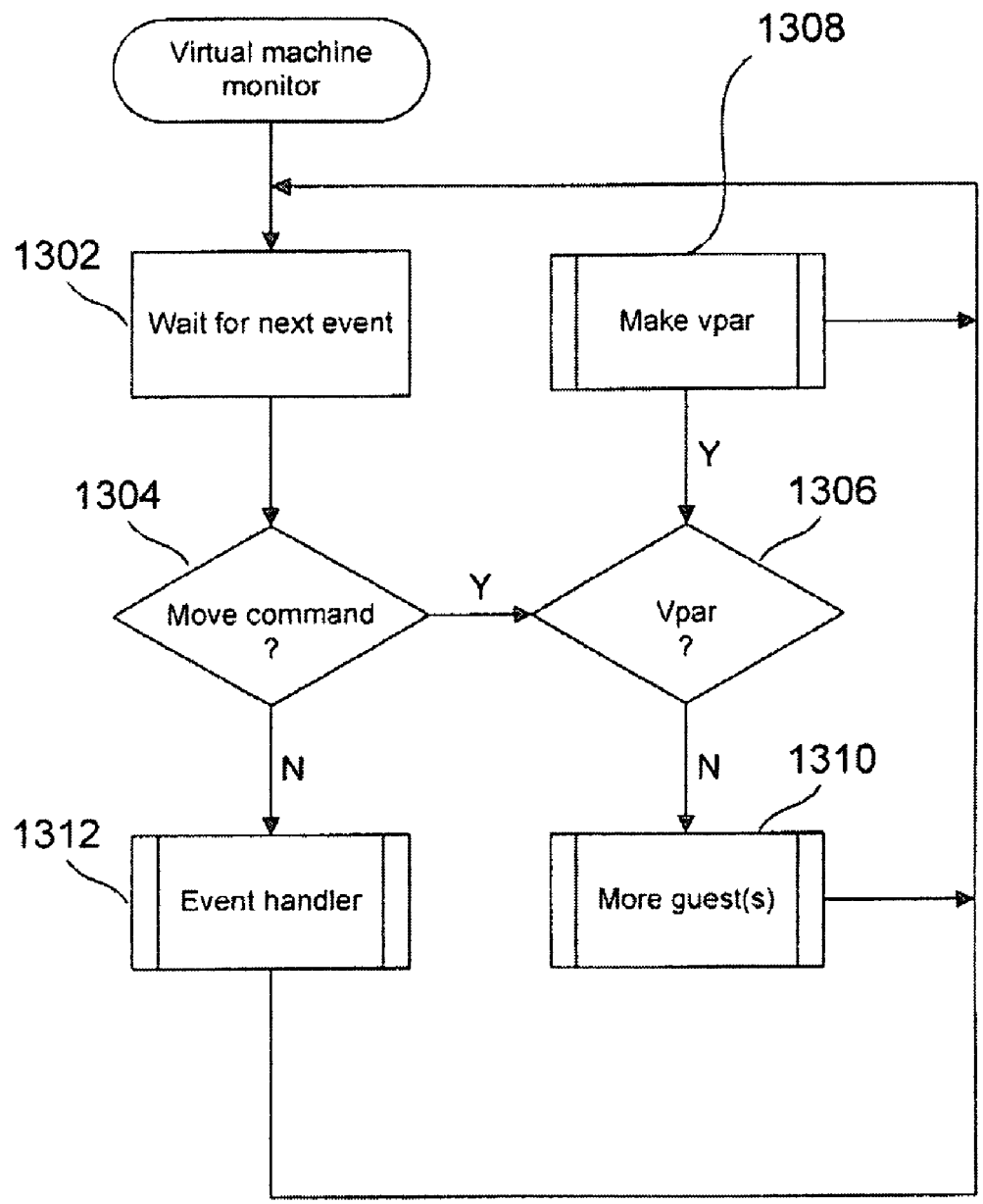
FIG. 13 provides a simple control-flow diagram for a virtual-machine monitor that carries out active VPAR movement between physical machines according to one embodiment of the present invention.

VPAR movement can be implemented to be carried out by a series of virtual-console commands. Alternatively, VPAR movement can be carried out by a virtual-machine monitor. FIG. 13 provides a simple control-flow diagram for a virtual-machine monitor that carries out active VPAR movement between physical machines according to one embodiment of the present invention.

The control-flow diagram in FIG. 13 shows an event-handling loop within a virtual-machine monitor. In step 1302, the virtual-machine monitor waits for a next event to occur. If the next event to occur is associated with reception of a soft-partition movement command, as determined in step 1304, then if the soft-partition movement command indicates movement of a VPAR from one machine to another, as determined in step 1306, the routine "move vpar" discussed above with reference to FIGS. 12A-B, is invoked to move the VPAR, in step 1308. Otherwise, currently existing guest-operating-system movement facilities within the virtual-machine monitor are invoked, in step 1310. All other events are handled by a generalized event handler, in step 1312.

Although the present invention has been described in terms of particular embodiments, it is not intended that the invention be limited to these embodiments. Modifications will be apparent to those skilled in the art. For example, routines for quiescing a VPAR and/or operating system within a VPAR, capturing an operating-system-execution-state image, transferring the operating-system-execution-state image to a remote VPAR on a target machine, and reinstantiating operation execution of the remote VPAR may be implemented in many different ways by varying the many different implementation parameters, including selection of programming language, control structures, data structures, variables, modular organization, and other such parameters. Active-VPAR-transfer may be implemented to execute in the context of an operating system, as a bare executable that runs directly above hardware within a VPAR, in firmware, or as a combination of these and other implementations. As discussed above, a push or pull strategy can be used for operating-system-execution-state image transfer between machines. Active-VPAR-transfer methods that transfer an active VPAR from a first computer to a second computer are necessarily carried out by execution of instructions that implement routines or other portions of control programs on both electronic computers, and cannot be carried out manually or abstractly by people.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method that transfers an active virtual partition from a first computer to a second, remote computer, the method executed on the first computer and the second computer, the method comprising:

quiescing an operating system and application programs executing within the active virtual partition;
creating a target virtual partition on the second computer;
preparing an operating-system-execution-state image for the quiescent active virtual partition;
transferring the operating-system-execution-state image from the first computer to the second computer, wherein transferring the operating-system-execution-state image from the first computer to the second computer further includes launching an operating-system-execution-state-image transfer routine in one of the active virtual partition or the target virtual partition; and reinstantiating execution state of the operating system encapsulated in the operating-system-execution-state image within the target virtual partition.

2. The method of claim 1 wherein quiescing the operating system and application programs executing within the active virtual partition further includes:

opening a virtual console to the first computer and issuing a quiesce command to the operating system.

3. The method of claim 1 wherein creating a target virtual partition on the second computer further includes: opening a virtual console to the second computer and issuing one or more commands to the virtual console to create the target virtual partition.

4. The method of claim 1 wherein preparing an operating-system-execution-state image for the quiescent active virtual partition further includes:

issuing a command through a virtual console to one of the operating system or the active virtual partition to execute an operating-system-execution-state-image preparation routine; and executing the operating-system-execution-state-image preparation routine to encode the execution-state image in memory, on one or more mass-storage devices, or both in memory and on one or more mass-storage devices.

5. The method of claim 4 wherein the operating-system-execution-state includes register values, TLB-entry values, virtualized memory to virtual and physical memory translations, and other values stored in memory.

6. The method of claim 4 wherein operating-system-execution-state image further includes a range of memory addresses and memory-copy instructions to allow the contents of memory used by the active virtual partition to be copied to the memory of the second computer system.

7. The method of claim 1 wherein reinstantiating execution state of the operating system encapsulated in the operating-system-execution-state image within the target virtual partition further includes: issuing a command to the target virtual partition through a virtual console to re-launch the operating system in the target virtual partition and recover the operating system state encoded in the operating-system-execution-state image transferred to the second computer.

8. The method of claim 1, wherein the image transfer routine is contained in the target virtual partition.

9. The method of claim 8, wherein the operating-system-execution-state image is prepared using an image-capture routine in the active virtual partition.

10. The method of claim 1, wherein the image transfer routine is contained in the active virtual partition.

11. The method of claim 10, wherein the operating-system-execution-state image is prepared using an image-capture routine in the active virtual partition.

12. The method of claim 1, wherein the operating-system-execution-state image is prepared using an image-capture routine in the active virtual partition.

13. A computer that provides transfer of an active virtual partition from the computer to a second, remote computer, the computer comprising:

a virtual-partition monitor that creates and initializes a virtual partition through a virtual-console interface;

routines that quiesce the operating system running within an active virtual partition;

operating-system-execution-state image capture routines contained in the active virtual partition that prepare an operating-system-execution-state image for the operating system executing within the active virtual partition;

operating-system-execution-state image transfer routines contained in the active virtual partition that transfer the operating-system-execution-state image from the computer to the second computer; and operating-system re-launching routines that re-launch an operating system in a virtual partition and routines that recover an operating-system state using an operating-system-execution-state image.

14. The computer of claim 13 wherein the routines that quiesce the operating system running within an active virtual partition are included in one of: the operating system; the active virtual partition; and both the operating system and the active virtual partition.

15. The computer of claim 13 wherein the operating-system-execution-state image capture routines that prepare an operating-system-execution-state image within for the operating system executing within the active virtual partition are included in one of: the operating system; the active virtual partition; and both the operating system and the active virtual partition.

16. The computer of claim 13 wherein the operating-system-execution-state image transfer routines that transfer the operating-system-execution-state image from the computer to the second computer are included in one of: the operating system; the active virtual partition; and both the operating system and the active virtual partition.

17. The computer of claim 13, wherein the routines that quiesce the operating system are contained in the active virtual partition of the computer.

18. A system comprising:

a first computer comprising:

an active virtual partition to be transferred;

a virtual-partition monitor that creates and initializes the virtual partition through a virtual-console interface; and routines within the active virtual partition that quiesce the operating system running within the active virtual partition;

operating-system-execution-state image capture routines contained in the active virtual partition that prepare an operating-system-execution-state image for an operating system executing within the active virtual partition;

a second computer having a target virtual partition to receive a transfer of the active virtual partition;

operating-system-execution-state image transfer routines contained in the active virtual partition or the target virtual partition that transfer the operating-system-execution-state image from the first computer to the second computer; and operating-system re-launching routines that re-launch the operating system in the target virtual partition and routines that recover an operating-system state using the operating-system-execution-state image.

19. The system of claim 18, wherein the operating-system-execution-state image transfer routines are contained in the active virtual partition.

20. The system of claim 18, wherein the operating-system-execution-state image transfer routines are contained in the target virtual partition.

* * * * *